Figure 1:
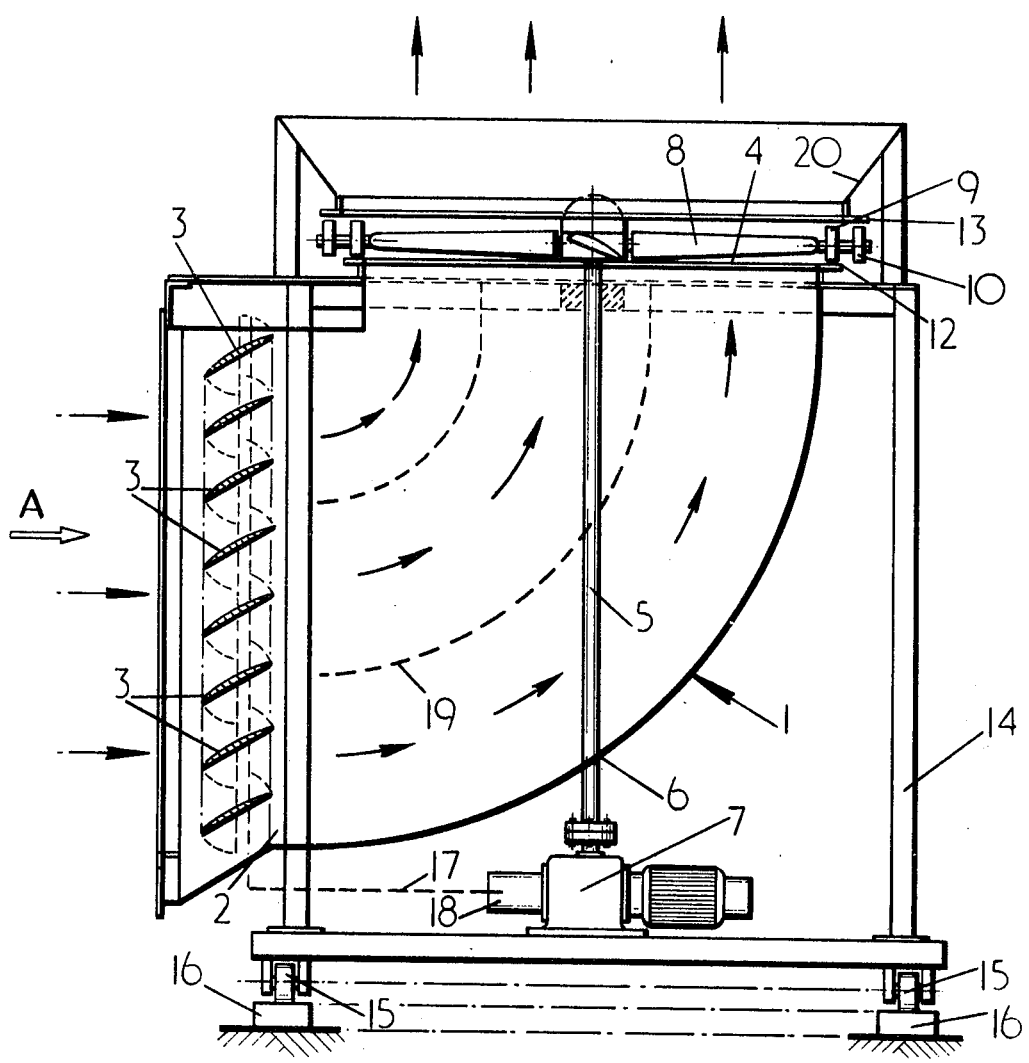

United States Patent [19]
Webster

[11] 4,154,556
[45] May 15, 1979

[54] DEVICES FOR UTILIZING THE POWER OF THE WIND

[76] Inventor: George W. Webster, 110 Crow Rd., Glasgow, Scotland

[21] Appl. No.: 802,586

[22] Filed: Jun. 1, 1977

[51] Int. Cl.² .................................................. F03D 7/04
[52] U.S. Cl. ........................................ 415/2; 415/151
[58] Field of Search ............................... 415/2-4, 415/151, 208, 119, 122 A, 141, 147, 183, 205, DIG. 8; 416/DIG. 6, 189; 290/55

[56] References Cited

U.S. PATENT DOCUMENTS

| | | | |
|---|---|---|---|
| 299,127 | 5/1884 | Garrigus | 415/2 |
| 581,311 | 4/1897 | Scovel et al. | 415/2 |
| 1,966,787 | 7/1934 | Bari | 415/119 |
| 2,112,608 | 3/1938 | Schmidt | 415/208 |
| 3,209,668 | 10/1965 | Haerter | 415/208 |
| 3,286,983 | 11/1966 | Schaeper, Jr. | 415/147 |
| 3,531,214 | 9/1970 | Abramson | 415/122 A |

FOREIGN PATENT DOCUMENTS

| | | | |
|---|---|---|---|
| 1011132 | 4/1952 | France | 415/DIG. 8 |
| 12096 | 5/1910 | United Kingdom | 415/2 |

*Primary Examiner*—C. J. Husar

[57] ABSTRACT

A wind power device incorporating a curved duct through which a rotatable shaft passes in a direction such that the axis of the shaft is normal to the plane containing one end of the curved duct and which continues through the curving portion of the wall of the duct opposite said end of the duct to the outside of the duct where it is connectible to a power-consuming device. A set of radially extending helically curved aerofoil blades is attached to the shaft at said end of the duct. Support means mounted on the blades at the tips thereof rest on a fixed annular guide means surrounding said end of the duct. Mounting means supports the duct in a position in which the shaft is vertical.

14 Claims, 4 Drawing Figures

DEVICES FOR UTILIZING THE POWER OF THE WIND

This invention relates to a device for utilizing the power of the wind.

A device for utilizing the power of the wind in the well known form of such devices usually includes a set of sails attached to a central shaft which is more or less horizontally orientated and means for swinging the assembly of shaft and sails around a vertical axis so that the sails can be made to face the oncoming wind from whichever direction the wind is blowing. Frequently means is provided for altering the angle of the sails to the plane of rotation. Various improved versions have been built these versions usually taking the form of having more than four sails of aspect ratio considerably greater than was traditional and being of metallic construction. Basically, however, the design remains much the same as it has existed for hundreds of years.

One of the drawbacks of the existing type of wind power plant lies in the vibration which occurs in the sails when they are operating in strong winds. The vibration occurring can become great enough to break the sails even although the normal tensile and bending stresses in the sails resulting from the same static load are within the capacity of the sails to bear. No satisfactory method of bracing the sails or shrouding the tips has been evolved to eliminate this severe drawback with the result that the normal practice in very high winds which would otherwise provide the most power is to rotate the device so that the plane of rotation of the sails makes an acute angle with the wind direction.

It is an object of the present invention to provide a wind power device which can utilize the full force of the wind without danger from wind-induced vibration.

A wind power device according to the invention incorporates a curved duct, a rotatable shaft which passes through the geometrical centre of one end of the duct in a direction such that the axis of the shaft is normal to the plane containing said end of the duct and which continues through the portion of the wall of the duct opposite said end of the duct to the outside of the duct where it is connectible to a power-consuming device, a set of radially extending helically curved aerofoil blades attached to the shaft at said end of the duct, the tips of the blades carrying support means engaged with a fixed annular guide means surrounding said end of the duct and mounting means arranged to support the duct in a position in which the shaft is vertical.

The support means may take the form of a flat ring to which the tips of all the blades are attached, the peripheral portion of the ring engaging the guide means. In this construction the guide means may be constituted by a multiplicity of pairs of rollers disposed around said end of the duct, the axes of the rollers being radial with respect to the shaft, the rollers of adjacent pairs being spaced from one another in a direction axially of the shaft and the peripheral portion of the flat ring passing between the rollers of each pair.

In an alternative construction said end of the duct may carry a rail curved in the form of a ring, each blade being fitted at the tip with a bracket supporting two wheels engaging opposite sides of the rail so that the rail is between the wheels. In this construction each blade may be connected at the tip to the adjacent blades by links connected to the blades by pivots.

In another construction said end of the duct may carry two parallel rails each formed as a ring surrounding and co-axial with the shaft, the tip of each blade carrying two rollers mounted on a swing arm and associated with biasing means urging the arm to swing towards a position in which the line connecting the axes of the two rollers is parallel with the axis of the shaft, the rollers being located between the rails. Alternatively the two rings may be of different diameters and the two rollers on each blade may be mounted co-axially on a common radially disposed shaft, each roller engaging a respective ring.

The duct may be mounted to be rotatable about the axis of the shaft.

The mounting means supporting the duct may be a frame which carries supporting means, e.g. rollers engaged with a fixed circular track, the axis of the shaft passing through the centre of the track.

The other end of the duct may be fitted with a set of swingable louvre blades disposed transversely across said other end of the duct.

The duct may contain wind directing vanes to maintain parallel flow of air passing through the duct.

The duct may carry a wind vane projecting from the duct on the opposite side of the shaft from the end of the duct fitted with the louvre blades.

Figure 2:
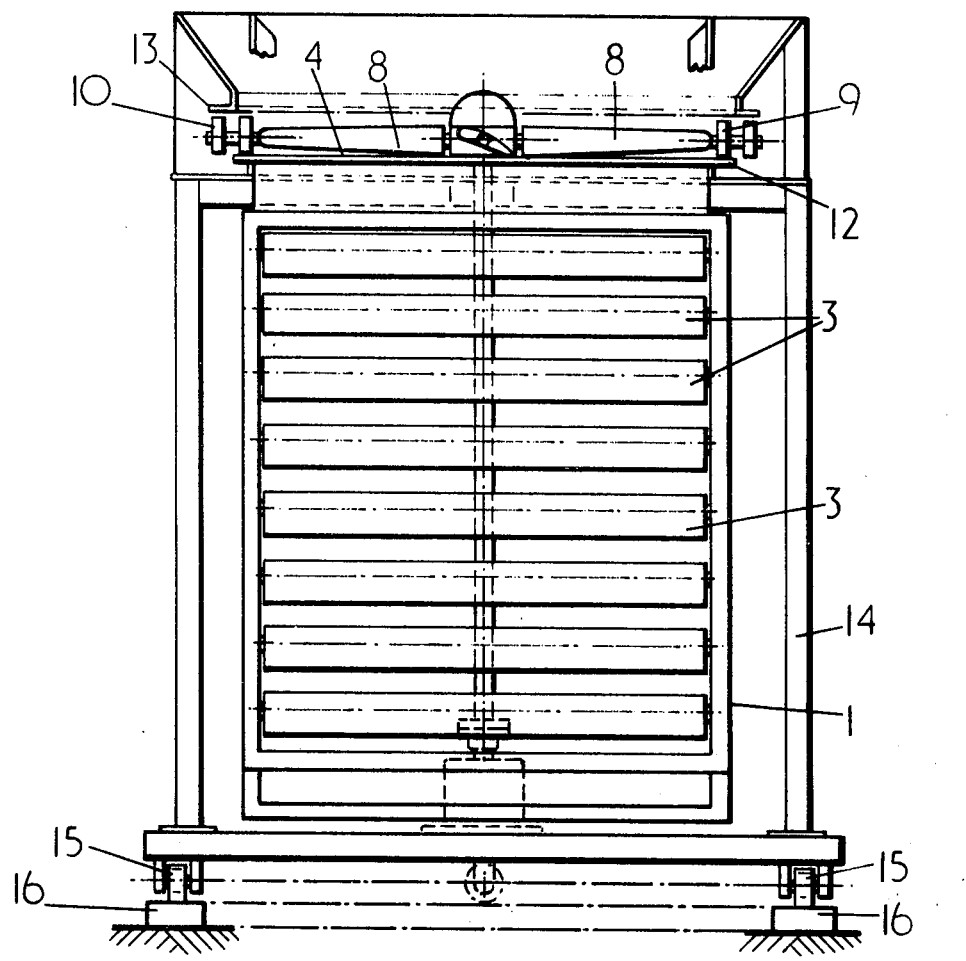
Figure 3:
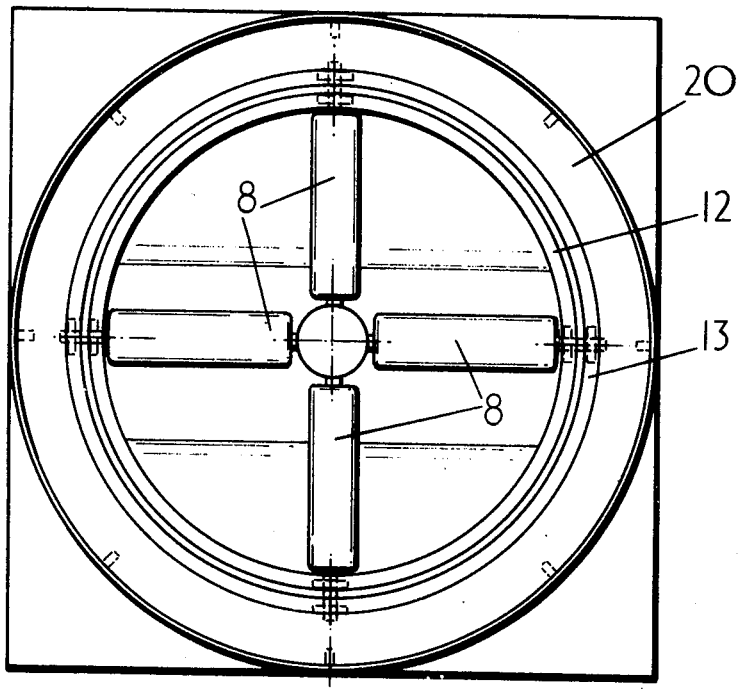

A practical embodiment of the invention is illustrated in the accompanying drawings in which FIG. 1 is a side elevation in section of a wind power device, FIG. 2 is an elevation looking in the direction of the arrow A in FIG. 1 and FIG. 3 is a plan view of the device.

Figure 4:
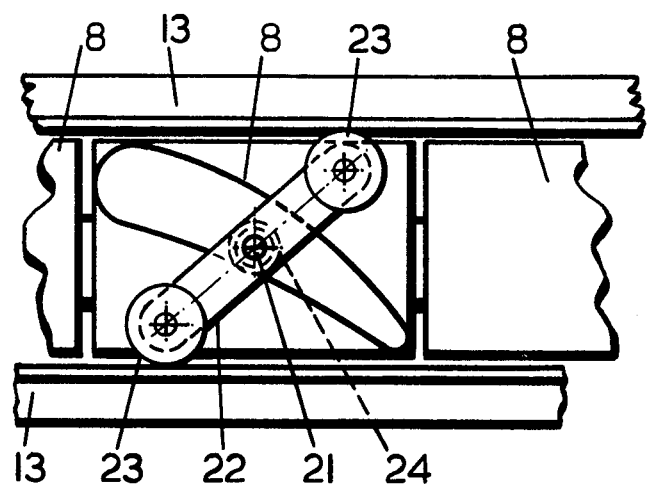

FIG. 4 is an end view of one of the blades and illustrates an alternative construction for supporting the tips of the blades.

In the drawings 1 denotes a duct curved through an angle of 90°, one end 2 being an entry end and being fitted with a set of swingable blades forming a louvre 3 disposed transversely across the entry end 2 and the other end 4 being a discharge end. 5 denotes a rotatable shaft which passes through the geometrical centre of the end 4 of the duct in a direction such that the axis of the shaft is normal to the plane containing the end 4, the shaft 5 continuing through the portion 6 of the wall of the duct opposite the end 4 and continuing to the outside of the duct where it is connected to a power-consuming device 7. 8 denotes a set of helically curved aerofoil blades attached to and radially extending from the shaft 5. Each blade 8 carries at the tip two coaxial rollers 9 and 10 mounted on a radially extending stub shaft 11, the rollers being arranged to run between respective circular guideways 12 and 13 of a guide means constituted by two rails curved into ring form. The duct 1 is carried by a frame 14 which is mounted on rollers 15 resting on a fixed circular track 16 concentric with the axis of the shaft 5 so that as the frame 14 rotates about the centre of the circular track 16 it also rotates about the axis of the shaft 5. 17 denotes an operative connection from a servo mechanism 18 controlled by the power consuming device 7 and arranged to operate the louvres 3 to set them in a particular position in accordance with the load on the device 7. 19 denotes wind directing vanes in the duct to promote streamline flow of air passing through the duct.

Means not shown sensitive to the wind direction is arranged to operate driving mechanism for the rollers 15 causing the rollers 15 to rotate and swing the frame 14 about the axis of the shaft 5 to a desired orientation relative to the wind direction. The power consuming device 7 may be an electrical generating plant or a pumping plant. The guideways 12 and 13 may be formed as part of a tubular casing 20 provided at the end 4 of the duct to promote a smooth flow of air leaving the end 4 of the duct so that the blades 8 may operate at their greatest efficiency.

In FIG. 4 which illustrates an alternative construction for supporting the blades 21 denotes a pivot pin projecting radially from the tip of each blade, 22 denotes a swing arm mounted on the pivot pin 21, 23 denotes rollers mounted on the swing arm 22 at opposite ends of the swing arm and 24 denotes spring means connected between the blade 8 and the swing arm 22 and arranged to urge the swing arm to swing into alignment with the axis of the shaft 5.

In practice, the mounting means 14 holds the duct 1 so orientated that the axis of the shaft 5 is vertical the rollers 15 resting on the track 16 permitting the duct to swing about any chosen angle up to a full circle around the axis of the shaft 5. For normal locations the duct is curved through an angle of 90° but if the device is to be mounted on a sloping site the duct may be curved to less than 90° to take account of the fact that wind will normally blow up a slope even if it may strike the lower part of the slope horizontally. The track 16 will, however, always be horizontal so that the duct can swing about the vertical axis of the shaft. Wind entering the duct at the entry end 3 is guided around the duct by the vanes 19 and through the blades 8 which thereupon rotate, the rotational movement being communicated to the shaft 5 and thus to the power consuming device 7 connected to the shaft 5. The guideways 12 and 13 reduce flexure of the blades resulting both from wind force and any vibration which tends to occur in the blades and the guideway 12 additionally supports the weight of the blades, The amplitude of the vibration of the blades is limited by the normal running clearance between the rollers 9 and 10 and the guideway. This makes it possible to utilize the full wind power even at high wind speeds without danger to the blades.

In the construction of FIG. 4 each spring 24 urges the associated swing arm 22 to swing to a position in which the rollers 23 are pressed against the respective rail 13. This construction eliminates or damps out vibration of the blades because no clearance occurs between the rollers and the guideway constituted by the rails. Any irregularity in the spacing of the guide rails 13 or in the surface thereof is eliminated by a corresponding swinging action of each arm 22 so that each blade 8 is firmly but elastically connected during its radial movement. Where control of the power output is required, this is effected by swinging the blades of the louvre 3 to alter the effective area of the entry end 3 of the duct. The wind vane on the duct where this is provided causes the duct to swing to face the wind. Alternatively a device sensitive to the wind direction rotates the rollers 15 whereby to swing the duct to face into the wind, The mounting of the blades to rotate in a horizontal plane facilitates supporting of the blades since the weight of the blades is borne evenly around the entire circumference of the guideway 12. In the normal type of wind power device the whole blade assembly tends to sag by its own weight thus rendering proper support virtually impossible because the clearance which would require to be allowed would be too great to have any effect in suppressing the large amplitude vibration experienced in unsupported blades whereas if the clearance were made small enough to suppress vibration the guiding means would then require to support the weight of the sagging assembly and would not only have to be of heavy construction but the blades themselves would also require to be of heavy construction since they would require to bear the weight of the assembly also.

The present unique construction of curved duct leading to a set of blades arranged to rotate in a horizontal plane supported at the extremities has solved all the problems previously encountered in the provision of large wind driven plants.

What is claimed is:

1. A wind power device comprising:
    a frame;
    means for rotatably mounting said frame;
    a curved duct carried by said frame for rotation therewith having one end lying in a substantially horizontal plane;
    a rotatable shaft extending through the geometric center of said one end of the duct having its axis normal to the plane of said one end, said shaft also extending through a curved wall portion of the duct opposite said one end thereof and continuing outwardly of said wall portion so as to be connectible to a power-consuming device;
    a plurality of radially extending helically curved aerofoil blades attached to said shaft at said one end of the duct;
    a pair of axially spaced annular rails carried by said duct at said one end thereof having different diameters and encircling the aerofoil blades;
    a stub shaft projecting radially from the tip of each of one end of the duct having its axis normal to the plane of said one end, said shaft also extending through a curved wall portion of the duct opposite said one end thereof and continuing outwardly of said wall portion so as to be connectible to a power-consuming device;
    a plurality of radially extending helically curved aerofoil blades attached to said shaft at said one end of the duct;
    a swing arm mounted pivotably at the end of each said blade swingable about a radial axis;
    a roller carried rotatably at each of the opposed ends of said swing arms, said rollers being rotatable about parallel axes;
    a pair of axially spaced annular rails mounted coaxially on said duct at said one end thereof, said rails encircling the aerofoil blades and said rollers being located between said rails;
    biasing means operative upon each of said swingable arms to said blades;
    a pair of rollers mounted in axially spaced relation on each of said stub shafts, each said roller engaging a respective one of said annular rails;
    said means for rotatably mounting said frame being arranged to support the duct such that said rotatable shaft is vertically disposed.

2. A device as claimed in claim 1 in which the duct is mounted on said frame to be rotatable about the axis of the rotatable shaft.

3. A device as claimed in claim 1 in which wind directing vanes to maintain parallel flow of air passing through the duct are contained within the duct.

4. A device as claimed in claim 1 in which a set of swingable louvre blades is fitted to the other end of the duct in a disposition transversely across said other end of the duct.

5. A device as claimed in claim 4 in which a wind vane carried by the duct projects from the duct on the opposite side of the shaft from the end of the duct fitted with louvre blades.

6. A wind power device according to claim 1, wherein said frame mounting means comprises a stationary circular track and a plurality of rollers depend from said frame to rest thereon.

7. A device as claimed in claim 1 in which the duct is mounted on said frame to be rotatable about the axis of the rotatable shaft.

8. A device as claimed in claim 1 in which a set of swingable louvre blades is fitted to the other end of the duct in a disposition transversely across said other end of the duct.

9. A device as claimed in claim 1 in which wind directing vanes to maintain parallel flow of air passing through the duct are contained within the duct.

10. A wind power device comprising:
a frame;
means for rotatably mounting said frame;
a curved duct carried by said frame for rotation therewith having one end lying in a substantially horizontal plane;
a rotatable shaft extending through the geometric center of said one end of the duct having its axis normal to the plane of said one end, said shaft also extending through a curved wall portion of the duct opposite said one end thereof and continuing outwardly of said wall portion so as to be connectible to a power-consuming device;
a plurality of radially extending helically curved aerofoil blades attached to said shaft at said one end of the duct;
a swing arm mounted pivotably on each said blade at the tip thereof swingable about a radial axis;
a roller mounted at each of the opposed ends of said swing arms, the rollers of each swing arm being rotatable about parallel axes;
a pair of spaced co-axial annular rails mounted on said duct and encircling the blades with said rollers positioned between the rails;
and biasing means operative to urge each said arm to pivot and thereby tend to bring the rollers thereon into contact with the respective rails;
said means for rotatably mounting said frame being arranged to support the duct such that said rotatable shaft is vertically disposed.

11. A wind power device according to claim 10, wherein said frame mounting means comprises a stationary circular track and a plurality of rollers depend from said frame to rest thereon.

12. A device as claimed in claim 10 in which the duct is mounted on said frame to be rotatable about the axis of the rotatable shaft.

13. A device as claimed in claim 10 in which a set of swingable louvre blades is fitted to the other end of the duct in a disposition transversely across said other end of the duct.

14. A device as claimed in claim 10 in which wind directing vanes to maintain parallel flow of air passing through the duct are contained within the duct.

* * * * *